United States Patent [19]

Moore et al.

[11] 3,856,859

[45] Dec. 24, 1974

[54] SELECTIVE NITRATION PROCESS

[75] Inventors: George G. I. Moore, Birchwood; Larry R. Lappi, Lake Elmo, both of Minn.

[73] Assignee: Riker Laboratories, Inc., Northridge, Calif.

[22] Filed: June 8, 1973

[21] Appl. No.: 368,359

[52] U.S. Cl. ......... 260/556 A, 260/556 F, 260/688, 71/103, 424/321
[51] Int. Cl. .......................................... C07c 143/74
[58] Field of Search ............. 260/556 A, 556 F, 688

[56] References Cited
UNITED STATES PATENTS

| | | | |
|---|---|---|---|
| 2,794,834 | 6/1957 | Randall et al. | 260/556 A |
| 2,868,844 | 1/1959 | Coffield et al. | 260/688 |
| 3,417,146 | 12/1968 | Linn et al. | 260/688 |

OTHER PUBLICATIONS

Unit Processes in Organic Synthesis, Groggins, 3d ed., (1947), pages 1, 10–13, QD 262 G7.
JACS 54 : 2470–2476, (1932), Shriner et al.

*Primary Examiner*—Henry R. Jiles
*Assistant Examiner*—S. D. Winters
*Attorney, Agent, or Firm*—Alexander, Sell, Steldt & DeLaHunt

[57] ABSTRACT

The position-selective nitration of alkanesulfonanilides substituted by ortho-phenoxy, -phenylthio, -phenylsulfinyl or -phenylsulfonyl groups is achieved by carefully treating the substrate with an equimolar amount of a nitrating agent.

11 Claims, No Drawings

SELECTIVE NITRATION PROCESS

BACKGROUND OF THE INVENTION

Nitration of aromatic compounds is an old and well-known synthetic technique. Its practical utility is limited by the formation of isomer mixtures which are difficult to separate. Thus, it is known that nitration of benzene derivatives substituted by activating groups (i.e. those having Hammett sigma factors less than zero such as hydroxy, alkoxy, phenoxy, acetamido, alkyl and the like) occurs readily, providing mixtures of benzenes substituted in both the ortho and para positions with negligible amounts of meta isomers being formed. For example, anisole when nitrated by nitric acid plus sulfuric acid is reported to give 31% ortho, 67% para and less than 2% meta (Griffiths, P.H., et al., J. Chem. Soc. (1934) 631). Acetanilide when nitrated with nitric acid plus sulfuric acid is reported to give 19.4% ortho, 78.5% para and less than 3% meta (Arnall, F., et al., J. Soc. Chem. Ind., London (1929) 48, 159 T). Toluene when nitrated with nitric acid is reported to give 57% ortho, 40% para and 3% meta (Holleman, A. F., et al., Rec. Trav. Chim. Pays Bas (1914) 33,1).

Furthermore, when acetic anhydride was used as a solvent, Halvarson, K., et al, Ark. Kemi (1957) 11,77 nitrated anisole to obtain 71% ortho, 28% para and less than 0.5% meta substitution. Arnall (op. cit.) nitrated acetanilide in acetic anhydride to obtain 67.8% ortho, 29.7% para and less than 3% meta. Thus the art shows that the use of acetic anhydride as a solvent favors formation of ortho isomers in simply substituted activated benzenes. When anisole was nitrated in acetic acid Griffiths (op. cit.) obtained 44% ortho, 54% para and less than 3% meta substitution. Phenol gives primarily ortho isomer and considerable amounts of dinitrated product when dinitrogen tetraoxide is used to nitrate (J. Org. Chem. 31, 1469, 1966).

DETAILED DESCRIPTION OF THE INVENTION

It has been found, in connection with the present invention that certain ortho-substituted alkanesulfonanilides are nitrated selectively and in high yields para to the alkanesulfonamido substituent. More particularly, this invention relates to a process for the para nitration of haloalkylsulfonanilides and alkylsulfonanilides substituted by ortho-phenoxy, ortho-phenylthio, ortho-phenylsulfinyl or ortho-phenylsulfonyl groups comprising treating the substrate with at least an equimolar amount of a nitrating agent. Preferably, the invention relates to a process for the para nitration of a compound of the formula

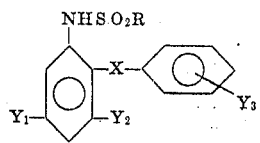

wherein R is lower alkyl or haloalkyl, X is oxygen, sulfur, sulfinyl or sulfonyl (preferably oxygen or sulfur), $Y_1$ and $Y_2$ are independently hydrogen, lower alkoxy, lower alkyl, halogen or acetamido provided that one of $Y_1$ and $Y_2$ must by hydrogen and $Y_3$ is hydrogen, halogen, lower alkoxy or lower alkyl comprising treating the substrate with at least an equimolar amount of a nitrating agent. The term "lower" herein indicates a group containing not more than four carbon atoms.

The nitration occurs on the ring to which the haloalkyl- or alkylsulfonamido group (hereinafter the "sulfonamido" group) is bonded. A nitrating agent is utilized, preferably in an approximately equimolar amount. Although at least an equimolar amount is preferred, under certain conditions even an excess of nitrating agent such as nitric acid or dinitrogen tetraoxide has been found to give only mononitration.

The nitration with nitric acid may be carried out in a solvent such as acetic anhydride or preferably acetic acid, or nitric acid may be used without solvent. Other nitration techniques which also provide satisfactory results include dinitrogen tetraoxide in an inert solvent (which is the presently preferred method), nitrosyl chloride and ferric chloride in an inert solvent in the presence of oxygen, nitrite salts such as sodium nitrite in an acidic solvent in the presence of an oxygen donor such as air or the solvent, nitrate salts such as sodium nitrate in an acidic solvent, and the like.

The reaction temperature is about −30° C. to 110° C., and preferably about −10° C. to 100° C., although this may be raised or lowered somewhat to adjust the rate of reaction depending on the particular nitrating agent and solvent system.

The reaction time is generally ¼ hour to 10 hours, but this may be shortened or lengthened depending upon the substrate, the nitrating agent and the reaction temperature. The extent of completion of the reaction is conveniently monitored by thin layer chromatography or preferably by vapor phase chromatography.

Compounds prepared using the synthetic method of the present invention have the following formula:

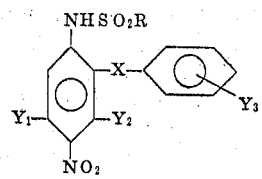

wherein R, X, $Y_1$, $Y_2$ and $Y_3$ are as previously defined.

The haloalkyl or alkyl portion (R) of the sulfonamido group may be straight or branched chain. Preferably the R group contains one to four carbon atoms, and, most preferably, one carbon atom.

The halogen of the haloalkane groups is preferably fluorine or chlorine, although bromine and iodine are also feasible.

One of $Y_1$ and $Y_2$ may be halogen, preferably fluorine or chlorine, or lower alkoxy or alkyl, preferably methyl or methoxy, or acetamido. Preferably both $Y_1$ and $Y_2$ are hydrogen. $Y_3$ is preferably in the para position and the presently preferred substituents are hydrogen, fluorine, chlorine, methoxy and methyl.

The compounds prepared by the process of the invention are useful in one or more of the following areas: herbicides, anti-microbials, polymer curing agents and intermediates, and, particularly, anti-inflammatory agents.

The following examples are provided to illustrate the invention, but are not intended to be limiting thereof. All yields are for purified product unless otherwise noted. Melting points are uncorrected.

EXAMPLE 1

2-Phenoxymethanesulfonanilide (13.16 g., 0.050 mole) and 250 ml. of acetic anhydride are heated to 100° C. and nitric acid (4.5 g., 0.05 mole) is added dropwise over 0.5 hour. The mixture is maintained at about 90° C. overnight, then cooled and poured into water. The solid product is separated by filtration and dried to provide 13.5 g. (87%) of 2-phenoxy-4-nitromethanesulfonanilide.

EXAMPLE 2

2-Phenoxymethanesulfonanilide (17.3 g, 0.0675 mole) is dissolved in glacial acetic acid (175 ml) by warming to about 90° C. The mixture is stirred and 70 percent nitric acid (5.92 g, 0.0675 mole) is added dropwise over 15 minutes. The mixture is heated on a steam bath for four hours, poured into water and the precipitate is separated by filtration. The product, 4-nitro-2-phenoxymethanesulfonanilide, is a light tan solid, m.p. 143°–144.5° C. after recrystallization from ethanol, yield 73%.

| Analysis: | %C | %H | %N |
|---|---|---|---|
| Calculated for $C_{13}H_{12}N_2O_5S$: | 50.6 | 3.9 | 9.1 |
| Found: | 50.6 | 3.8 | 9.1 |

The following compounds are prepared using the method of Example 2.

2-(4'-Chlorophenoxy)-4-nitrotrifluoromethanesulfonanilide, m.p. 129°–130° C.

5-chloro-4-nitro-2-phenoxytrifluoromethanesulfonanilide, m.p. 123°–125° C.

5-methyl-m.p. 97°–99° C.

5-methoxy-4-nitro-2-phenoxytrifluoromethanesulfonanilide, m.p. 133°–135° C.

4-nitro-2-phenoxydifluoromethanesulfonanilide, m.p. 92°–94° C.

3-Chloro-4-nitro-2-phenoxytrifluoromethanesulfonanilide, m.p. 101°–102° C.

5-Acetamido-4-nitro-2-phenoxytrifluoromethanesulfonanilide, m.p. 142.5°–144.5° C.

4-Nitro-2-phenylthiotrifluoromethanesulfonanilide m.p. 69°–70.5° C. 48%

2-(4'-Chlorophenylthio)-4-nitrotrifluoromethanesulfonanilide, m.p. 89°–90° C.

Triethylammonium 2-(4'-bromophenylthio)-4-nitrotrifluoromethanesulfonanilide, m.p. 90°–92° C.

4-Nitro-2-phenoxytrifluoromethanesulfonanilide, m.p. 146°–148° C.

2-(4'-Fluorophenoxy)-4-nitrotrifluoromethanesulfonanilide, isolated as the triethylammonium salt, m.p. 95°–98° C.

2-(2'-Methylphenoxy)-4-nitrotrifluoromethanesulfonanilide, b.p. 180° C./0.6 mm.

2-(2'-Chlorophenoxy)-4-nitrotrifluoromethanesulfonanilide, b.p. 190° C./0.6 mm.

2-(4'-Chlorophenoxy)-4-nitrodifluoromethanesulfonanilide, m.p. 111.5°–114.5° C.

2-(4'-Methylphenoxy)-4-nitrotrifluoromethanesulfonanilide, m.p. 100°–105° C.

2-(4'-Chlorophenoxy)-4-nitrofluoromethanesulfonanilide, m.p. 137°–138.5° C.

4-Nitro-2-phenoxyfluoromethanesulfonanilide, m.p. 104°–105° C.

4-Nitro-2-phenoxy-n-butanesulfonanilide, m.p. 117.5°–119° C.

2-(4'-Chlorophenoxy)-4-nitrochloromethanesulfonanilide, m.p. 148°–149.5° C.

4'-nitro-2'-phenoxy-2,2,2-trifluoroethanesulfonanilide, m.p. 143°–145° C., 53%

5-Chloro-2-(2', 4'-dichlorophenoxy)-4-nitromethanesulfonanilide, m.p. 163°–165° C. 61%

5-Chloro-4-nitro-2-phenoxymethanesulfonanilide, m.p. 137°–139° C.

5-Chloro-2-(2',4'-dichlorophenoxy)-4-nitrotrifluoromethanesulfonanilide, m.p. 125°–127° C., 61%

EXAMPLE 3

To an ice-cooled solution of 2.0 g. (7.6 mmole) of 2-phenoxymethanesulfonanilide in 30 ml of trifluoroacetic acid is added dropwise a solution of 0.66 g. (7.7 mmole) of sodium nitrate in 3 ml of water. The mixture is allowed to warm to about 25° C. then poured into water. The product is isolated by filtration and recrystallized from ethanol to provide 2.0 g. (86%) of 4-nitro-2-phenoxymethanesulfonanilide, m.p. 144°–147° C.

EXAMPLE 4

Into a solution of 2.0 g. (7.6 mmole) of 2-phenoxymethanesulfonanilide in 20 ml of dichloroethylene containing 0.5 g. of ferric chloride is bubbled nitrosyl chloride for twenty minutes. The mixture is poured into water and the mixture is extracted with dichloroethane. The extracts are evaporated under vacuum to provide a dark oily solid. Two recrystallizations provide a 25% yield of 4-nitro-2-phenoxymethanesulfonanilide, m.p. 141°–145° C.

EXAMPLE 5

To an ice cold solution of 1.0 g. (0.011 mole) of dinitrogen tetraoxide in chloroform (50 ml) is added 2-phenoxymethanesulfonanilide (1.0 g., 0.0038). After 15 minutes of stirring the mixture is evaporated under vacuum to dryness. The solid residue is recrystallized from aqueous ethanol to provide 0.77 g. of 4-nitro-2-phenoxymethanesulfonanilide, m.p. 146°–148° C., yield 66%.

EXAMPLE 6

To an ice-cooled 20 ml portion of concentrated nitric acid is added 2.0 g. (7.6 mmole) of 2-phenoxymethanesulfonanilide and the mixture is stirred for 20 minutes. The mixture is added to 100 ml of water and the product is separated by filtration and washed with water. Recrystallization from ethanol provides 1.7 g. (73%) of 4-nitro-2-phenoxymethanesulfonanilide, m.p. 143°–146° C.

EXAMPLE 7

To an ice-cooled solution of 5.0 g. (19 mmole) of 2-phenoxymethanesulfonanilide 40 ml of trifluoroacetic acid is added dropwise a solution of 1.3 g. (19 mmole) of sodium nitrite in 10 ml of water. After stirring one hour the mixture is poured into water, then extracted with dichloromethane. The extracts are dried over magnesium sulfate, then evaporated under vacuum to provide a solid residue which is recrystallized three times from a dichloroethane/hexane mixture to provide 3.5 g. (60%) of 4-nitro-2-phenoxymethanesulfonanilide, m.p. 144°–147° C.

EXAMPLE 8

To a solution of 1.685 kg (8.9 mole) of 2-phenoxyaniline in 1.65 liters of pyridine at a temperature of 85° C. is gradually added 1.02 kg (8.9 mole) of methanesulfonyl chloride over three hours. The mixture is stirred and heated for one additional hour, then poured into a mixture of 6 liters of ice and 3 liters of concentrated hydrochloric acid. The solid product is collected by filtration, washed with 10% hydrochloric acid and then washed with water. The crude product 2-phenoxymethanesulfonanilide (2.33kg, 85%, m.p. 110°–117° C.) is recrystallized from an ethanol water mixture to give m.p. 118.5°–120° C.

EXAMPLE 9

A solution of 15.0 g. (0.057 mole) of 2-phenoxymethanesulfonanilide in 200 ml of chloroform is cooled to 3° C. and about 5 g. (about 0.057 mole) of dinitrogen tetraoxide in 60 ml of chloroform is added dropwise. The temperature rises to about 5° C. during the first half of the addition then the mixture is allowed to warm to about 25° C. The addition is continued and the reaction temperature rises to 28° C. After stirring for about one hour the mixture is flushed with nitrogen and diluted with 200 ml of hexane. The 4-nitro-2-phenoxymethanesulfonanilide precipitates and is collected by filtration, 14.0 g. (80%) m.p. 145°–147° C. after air drying.

EXAMPLE 10

A solution of 5 g. (1.019 mole) 2-phenoxymethanesulfonanilide in 20 ml of trifluoroacetic acid is treated with 0.88 g. (0.0095 mole) of dinitrogen tetraoxide in 8 ml of trifluoroacetic acid at about 25° C. The reaction temperature rises to 35° C. The reaction mixture is analyzed by thin layer chromatography and the reaction is found to have proceeded to completion.

What is claimed is:

1. A process for the para nitration of haloalkylsulfonanilides and alkylsulfonanilides substituted by orthophenoxy, ortho-phenylthio, ortho-phenylsulfinyl or orthophenylsulfonyl groups comprising treating the substrate with at least an equimolar amount of a nitrating agent.

2. the process of claim 1 wherein the solvent is acetic acid and the nitrating agent is nitric acid.

3. The process of claim 1 wherein the solvent is acetic anhydride and the nitrating agent is nitric acid.

4. The process of claim 2 wherein the reaction temperature is 60° to 110° C.

5. The process of claim 1 wherein the nitrating agent is 50 to 100% nitric acid.

6. A process for the para nitration of a compound of the formula

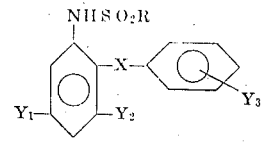

wherein R is lower alkyl or haloalkyl, X is oxygen or sulfur, sulfinyl or sulfonyl, $Y_1$ and $Y_2$ are independently hydrogen, lower alkoxy, lower alkyl, halogen or acetamido provided that one of $Y_1$ and $Y_2$ must be hydrogen and $Y_3$ is hydrogen, halogen, lower alkoxy or lower alkyl comprising treating the substrate with at least an equimolar amount of a nitrating agent.

7. A process according to claim 6 wherein X is oxygen.

8. A process according to claim 6 wherein the substrate is 2-phenoxymethanesulfonanilide.

9. The process of claim 6 wherein the nitrating agent is selected from the group consisting of 50 to 100% nitric acid, optionally using a solvent, dinitrogen tetraoxide in an inert solvent, nitrosyl chloride and ferric chloride in an inert solvent in the presence of an oxygen donor, nitrite salts in the presence of an oxygen donor such as air or the solvent and nitrate salts in an acidic solvent.

10. The process of claim 9 wherein the nitrating agent is dinitrogen tetraoxide.

11. The process of claim 10 wherein the solvent is an inert chlorinated hydrocarbon.

* * * * *